US011877973B2

(12) United States Patent
Park et al.

(10) Patent No.: US 11,877,973 B2
(45) Date of Patent: Jan. 23, 2024

(54) MASSAGE BALL ASSEMBLY WITH SEPARATE TILTING FRAME AND MASSAGE CHAIR WITH MASSAGE BALL ASSEMBLY APPLIED

(71) Applicant: COWAY CO., LTD., Gongju-si (KR)

(72) Inventors: Kyung Hwan Park, Seoul (KR); Yeon Soo Seong, Seoul (KR)

(73) Assignee: COWAY CO., LTD., Gongju-si (KR)

( * ) Notice: Subject to any disclaimer, the term of this patent is extended or adjusted under 35 U.S.C. 154(b) by 678 days.

(21) Appl. No.: 16/978,500

(22) PCT Filed: Mar. 5, 2019

(86) PCT No.: PCT/KR2019/002529
§ 371 (c)(1),
(2) Date: Sep. 4, 2020

(87) PCT Pub. No.: WO2019/172612
PCT Pub. Date: Sep. 12, 2019

(65) Prior Publication Data

US 2020/0397651 A1 Dec. 24, 2020

(30) Foreign Application Priority Data

Mar. 5, 2018 (KR) ........................ 10-2018-0025766

(51) Int. Cl.
*A61H 15/02* (2006.01)
*A61H 15/00* (2006.01)

(52) U.S. Cl.
CPC ..... *A61H 15/02* (2013.01); *A61H 2015/0007* (2013.01); *A61H 2015/0028* (2013.01);
(Continued)

(58) Field of Classification Search
CPC ............ A61H 15/02; A61H 2015/0007; A61H 2015/0028; A61H 2201/1669; A61H 2201/1633
See application file for complete search history.

(56) References Cited

U.S. PATENT DOCUMENTS 6,077,203 A * 6/2000 Lay .................... A63B 21/1609 482/79
6,832,991 B1 * 12/2004 Inada ................ A61H 15/0078 601/102
(Continued)

FOREIGN PATENT DOCUMENTS

KR 10-2009-0041011 A 4/2009
KR 10-2011-0124621 A 11/2011
(Continued)

OTHER PUBLICATIONS

International Search Report dated Jul. 5, 2019 in PCT/KR2019/002529 filed on Mar. 5, 2019, 2 pages.

*Primary Examiner* — Justine R Yu
*Assistant Examiner* — Matthew R Moon
(74) *Attorney, Agent, or Firm* — Oblon, McClelland, Maier & Neustadt, L.L.P.

(57) ABSTRACT

A massage ball assembly is for a massage chair. The massage ball assembly includes: a main frame; one or more tilting frames mounted to be rotatable with respect to the main frame; massage balls each mounted on the one or more tilting frames; and heating balls each mounted on the one or more tilting frames.

9 Claims, 7 Drawing Sheets

(52) U.S. Cl.
CPC ................ *A61H 2201/0149* (2013.01); *A61H 2201/0207* (2013.01); *A61H 2201/0228* (2013.01); *A61H 2201/1669* (2013.01)

(56) References Cited

U.S. PATENT DOCUMENTS

| | | | | |
|---|---|---|---|---|
| 2005/0148912 A1* | 7/2005 | Liao | A61H 15/00 | 601/99 |
| 2009/0149785 A1* | 6/2009 | Canto Garcia | A61H 7/007 | 601/99 |
| 2014/0142480 A1* | 5/2014 | Giraud | A61N 1/303 | 601/127 |
| 2015/0313790 A1* | 11/2015 | Inada | A61H 7/007 | 601/134 |
| 2018/0161232 A1* | 6/2018 | Grove | A47C 7/467 | |
| 2019/0201280 A1* | 7/2019 | Bak | A61H 39/04 | |

FOREIGN PATENT DOCUMENTS

| | | | | |
|---|---|---|---|---|
| KR | 10-1181240 B1 | 9/2012 | | |
| KR | 20160125879 A | * | 11/2016 | A61H 15/02 |
| KR | 10-1750859 B1 | 6/2017 | | |
| KR | 10-2017-0112910 A | 10/2017 | | |

* cited by examiner

MASSAGE BALL ASSEMBLY WITH SEPARATE TILTING FRAME AND MASSAGE CHAIR WITH MASSAGE BALL ASSEMBLY APPLIED

BACKGROUND OF THE INVENTION

1. Field of the Invention

The present disclosure relates to a massage ball assembly with a separate tilting frame.

2. Description of the Related Art

Many people receive massage to relieve a rigid body due to stress and muscle agglomeration due to lack of exercise. However, they cannot receive massage from professional masseuses for various reasons. Thus, massage chairs that can be conveniently equipped and used at home have been developed and used.

In conventional massage chairs, one main frame is mounted on both sides of a massage bundle mounted inside a backrest portion, and massage balls are mounted at both ends of the main frame, so that massage is performed while the massage bundle moves up and down, left and right.

However, since the massage balls rotate while being fixed to the main frame, even when the massage bundle moves up, down, left, and right, there is a disadvantage in that it is difficult to perform an optimal massage suitable for the curve of a seated person.

In fact, the shoulders, back, waist, and buttocks, where massage is intensively performed by the massage chair, are curved rather than straight. Thus, it is difficult to perform optimal massage according to the curve of the seated person only by moving the massage bundle up, down, left, and right.

(Patent Document 1) Korean Application Publication 10-2017-0112910 published on Oct. 12, 2017

(Patent Document 2) Korean Patent Publication 10-1750859 registered on Jun. 20, 2017

SUMMARY OF THE INVENTION

The present disclosure is devised to solve the above problems.

Specifically, the present disclosure provides a massage ball assembly in which a tilting frame mounted to be rotatable with respect to a main frame is further provided and massage balls and heating balls are mounted on the tilting frame so that a feeling of close massage reflecting the curve of the body may be provided, and a massage chair with the massage ball assembly applied.

According to an aspect of the present disclosure, there is provided a massage ball assembly for a massage chair, the massage ball assembly comprising a main frame (610), one or more tilting frames (620, 630) mounted to be rotatable with respect to the main frame (610), massage balls (621, 631) each mounted on the one or more tilting frames (620, 630), and heating balls (622, 632) each mounted on the one or more tilting frames (620, 630).

In an embodiment, the massage ball assembly may be fixed to a massage bundle (640) capable of making at least one of vertical movement and horizontal movement, and the massage bundle (640) may be mounted on a backrest portion (100) of a massage chair.

In an embodiment, the main frame (610) may comprise a fixing groove (611) for fixing to the massage bundle (640) and formed in a center of the main frame (610), a first main frame (612) extending from the fixing groove (611) toward the backrest portion (100), and a second main frame (613) extending from the fixing groove (611) downward.

In an embodiment, the tilting frames (620, 630) may comprise first mounting grooves (623, 633) for mounting on the main frame (610) and formed in centers of the tilting frames (620, 630), first tilting frames (624, 634) extending from the first mounting grooves (623, 633) toward the backrest portion (100), and second tilting frames (625, 635) extending from the first mounting grooves (623, 633) downward.

In an embodiment, in the main frame (610), second mounting grooves (614, 615) for mounting the tilting frames (620, 630) may be provided at a corresponding portion of a position where the first mounting grooves (623, 633) are formed, and may extend along a longitudinal direction of the main frame (610).

In an embodiment, the shape of the second mounting grooves (614, 615) for mounting the tilting frames (620, 630) may include a plurality of first shapes having the same shape as the shape of the first mounting grooves (623, 633), and the plurality of first shapes may partially overlap each other.

In an embodiment, the tilting frames (620, 630) may rotate with respect to the main frame (610) at a certain angle by using the first mounting grooves (623, 633) as a rotation axis, and the massage balls (621, 631) and the heating balls (622, 632) themselves may rotate at positions where the massage balls (621, 631) and the heating balls (622, 632) are mounted on the tilting frames (620, 630), respectively.

In an embodiment, the heating balls (622, 632) may be mounted on one of an end of the first tilting frames (624, 634) and an end of the second tilting frames (625, 635) to be closer to the fixing groove (611) than the massage balls (621, 631), and the massage balls (621, 631) may be mounted on an end of a tilting frame that is different from a tilting frame on which the heating balls (622, 632) are mounted.

In an embodiment, the tilting frames (620, 630) may be further connected to the main frame (610) by an elastic member (650).

In an embodiment, a heating wire may be provided inside the heating balls (622, 632).

According to another aspect of the present disclosure, there is a massage chair having the massage ball assembly described above, the massage chair including a seat portion (200), the backrest portion (100) rotatably fixed to one side of the seat portion (200), a leg fixing portion (300) rotatably fixed to the other side of the seat portion (200), a support frame (400) fixing the seat portion (200), the massage ball assembly mounted on the backrest portion (100) and capable of making one of vertical movement and horizontal movement by the massage bundle (640), and an operation portion (500) adjusting rotation of the backrest portion (100), rotation of the leg fixing portion (300), and vertical movement or horizontal movement of the massage ball assembly.

BRIEF DESCRIPTION OF THE DRAWINGS

The above and other features and advantages of the present disclosure will become more apparent by describing in detail exemplary embodiments thereof with reference to the attached drawings in which.

DETAILED DESCRIPTION OF THE INVENTION

Hereinafter, the present disclosure will be described in detail with reference to the accompanying drawings.

Figure 1:
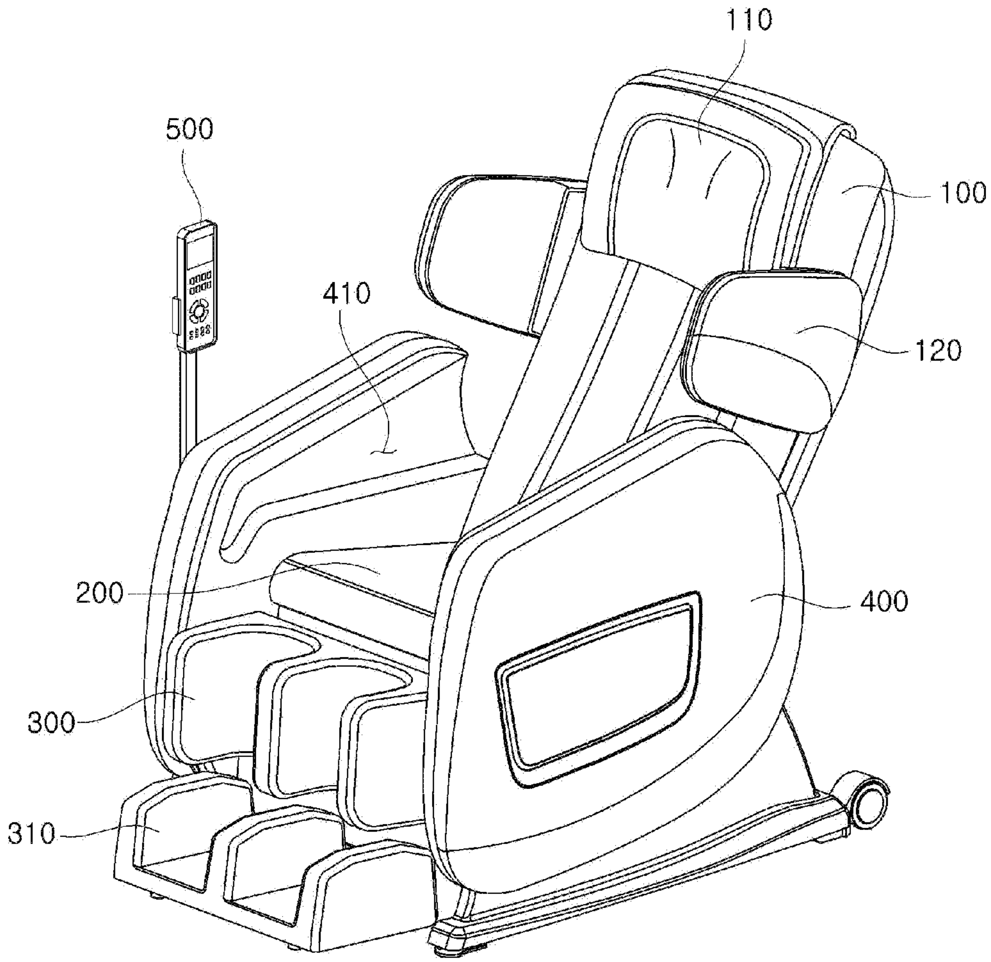
FIG. 1 is an overall perspective view of a massage chair according to an embodiment of the present disclosure.

Hereinafter, assuming that a user is seated on the massage chair in FIGS. 1 and 2, it will be described that the user's upper part is an upper side, the user's lower part is a lower side, the front viewed by the user is a backrest side, and the rear viewed by the user is an outside.

In addition, a backrest portion 100, a leg fixing portion 300, and a foot fixing portion 310, which will be described later, are capable of making rotational movement or vertical movement, respectively, and to this end, a separate actuator (not shown) is provided, which is well-known technology. Thus, a detailed description of an operating principle thereof will be omitted.

Furthermore, mode selection and change according to an operation portion 500, which will be described later, and an operation of the massage chair accordingly are performed when a signal is applied to the operation portion 500, the corresponding signal is transmitted to a control unit (not shown). This is also well-known technology. Thus, a detailed description of an operating principle thereof will be omitted.

1. Description of Massage Chair

A massage chair according to an embodiment of the present disclosure will be described with reference to FIGS. 1 and 2.

The massage chair comprises a backrest portion 100, a seat portion 200, a leg fixing portion 300, a support frame 400, and an operation portion 500, and further comprises a massage ball assembly 600 according to an embodiment of the present disclosure.

The backrest portion 100 supports the user's back and may be relatively adjusted at a certain angle with respect to the support frame 400 and the seat portion 200 fixed to the ground.

The massage ball assembly 600 that is movable is mounted in the center of the backrest portion 100.

The massage ball assembly 600, which is a structure comprising a plurality of massage balls and heating balls, may move up and down and left and right along a certain trajectory inside the backrest portion 100.

In addition, the plurality of massage balls may move in forward and backward directions. The height of the user's shoulders may be sensed using this. For example, when the massage ball assembly 600 moves from the lowermost to the upper side, the massage balls move backward from a reference position to meet the user's back. When backward movement is terminated and the massage balls return to the reference position, it means that the user's body is absent. Thus, the shoulder height may be checked using this.

In addition, when a massage operation is performed, while the massage ball assembly 600 moves along a predetermined trajectory inside the backrest portion 100, the plurality of massage balls press the user's back through the shoulders to provide a feeling of massage.

The heating balls are provided with a heating wire inside and can provide a feeling of heating to the user by heat generated by the heating wire.

A headrest 110 that the user's head touches is positioned on an upper portion of the backrest portion 100.

The headrest 110 is preferably made of a material capable of providing a cushioning feeling, and in other embodiments, a separate airbag may be provided inside.

A pair of shoulder fixing portions 120 are attached to both left and right sides of the headrest 110 of the backrest portion 100, and shoulder airbags 129 are mounted on the pair of shoulder fixing portions 120, respectively.

The pressure or amount of air applied to various airbags 129, 209, 309, 319, and 419 to be described later, including the shoulder airbag 129, may be adjusted.

The airbags 129, 209, 309, 319, and 419 need only a level of pressure or air that does not strongly compress the human body in order to position the user's body. Hereinafter, the injected air is referred to as "fixing air".

Furthermore, the airbags 129, 209, 309, 319, and 419 require a higher pressure or amount of air than the fixing air so as to perform a massage operation. Hereinafter, the air injected for this purpose is referred to as "massage air".

The seat portion 200, which is a portion where the user's buttocks and upper thighs contact, is generally fixed to the support frame 400. It is preferable that the seat portion 200 is made of a material capable of providing a cushioning feeling.

Pelvic airbags 209 are each positioned on both sides of the seat portion 200 and the support frame 400 facing the user inward.

Each of the pelvic airbags 209 may also include a pair of upper and lower airbags. In this case, the upper pelvic airbag 209 may also press the waist and thus will also be referred to as a waist airbag.

Figure 2:
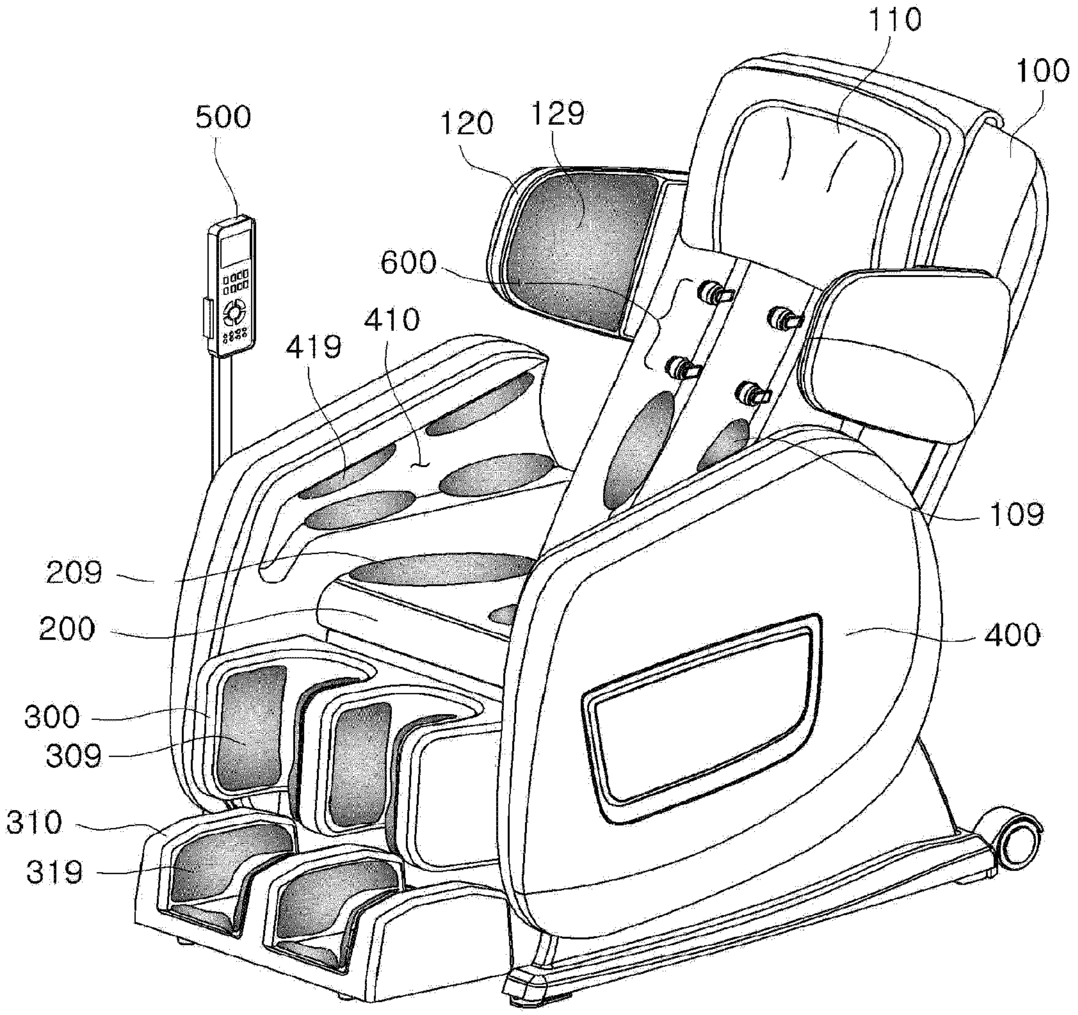
FIG. 2 is a perspective view illustrating an airbag of the massage chair of FIG. 1.

The leg fixing portion 300 that holds the user's leg has a pair of grooves so that the user's calf may be inserted, as shown in FIG. 2. The leg fixing portion 300 may be relatively adjusted at a certain angle with respect to the fixed support frame 400 and the seat portion 200.

The leg air bag 309 is positioned in the groove of the leg fixing portion 300.

Referring to FIG. 2, in the embodiment of the present disclosure, each airbag of a pair of left and right is also provided as a pair of upper and lower bags, so that one leg airbag 309 includes a total of four airbags. Alternatively, each of the one leg airbag 309 may include a pair of left and right airbags.

The foot fixing portion 310 fixes the foot placed by the user during the massage operation and has a groove so that the user's foot may be inserted.

In the embodiment of the present disclosure, the foot fixing portion 310 is formed integrally with the leg fixing portion 300. Alternatively, the foot fixing portion 310 may make relatively vertical movement with respect to the leg fixing portion 300 to be properly adjusted to the user's body size (leg or calf length).

The foot airbag 319 is positioned in the groove of the foot fixing portion 310.

Referring to FIG. 2, in the embodiment of the present disclosure, each airbag of a pair of left and right includes a pair of upper and lower bags, so that one foot airbag 319 includes a total of four airbags. Alternatively, each foot airbag 319 may include a pair of left and right airbags.

The support frame 400 is positioned on the left and right sides of the seat portion 200 and securely fixes the massage chair as a whole even during the operation of the backrest portion 100 and the leg fixing portion 300 or the operation of the foot fixing portion 310. To this end, a bracket capable of fixing the massage chair to the floor may be positioned on a bottom end of the support frame 400.

An arm fixing portion 410 is positioned on a top end of the support frame 400.

The arm fixing portion 410 fixes the arm placed by the user during the massage operation and has a groove (see FIG. 1) so that the user's arm may be inserted.

The arm airbag 419 is positioned in the groove of the arm fixing portion 410.

In the embodiment of the present disclosure, each of upper and lower pairs of airbags includes a pair of left and right airbags, so that one arm airbag 419 includes a total of four airbags. Alternatively, each of the arm airbags 419 may include a pair of upper and lower airbags.

The operation portion 500, which is capable of manipulating the operation of the user's massage chair, may include a button or touch panel.

In the embodiment of the present disclosure, the operation portion 500 is provided on the right side of the massage chair to enable manipulation with the right hand, and alternatively, the operation portion 500 may be provided on the left side and may be operated with the left hand.

It is preferable that the operation portion 500 and the massage chair are connected with a material that is rigid and capable of changing its shape to some extent, and a cable that connects the operation portion 500 and the control unit (not shown) inside the massage chair may be mounted inside the operation portion 500.

The user may select various modes through the operation portion 500 so that signals may be applied to the control unit (not shown). Thus, the operation portion 500 may transmit signals corresponding to the corresponding mode to the control unit (not shown).

The signals received by the control unit are configured to operate an actuator (not shown), etc. to operate the backrest portion 100, the leg fixing portion 300, and the foot fixing portion 310 to change each angle, or to control various airbags 129, 209, 309, 319, and 419 and the operations of a massage ball assembly 600.

2. Description of Massage Ball Assembly

Hereinafter, the massage ball assembly 600 according to the embodiment of the present disclosure will be described in detail with reference to FIGS. 3 to 5.

Figure 3:
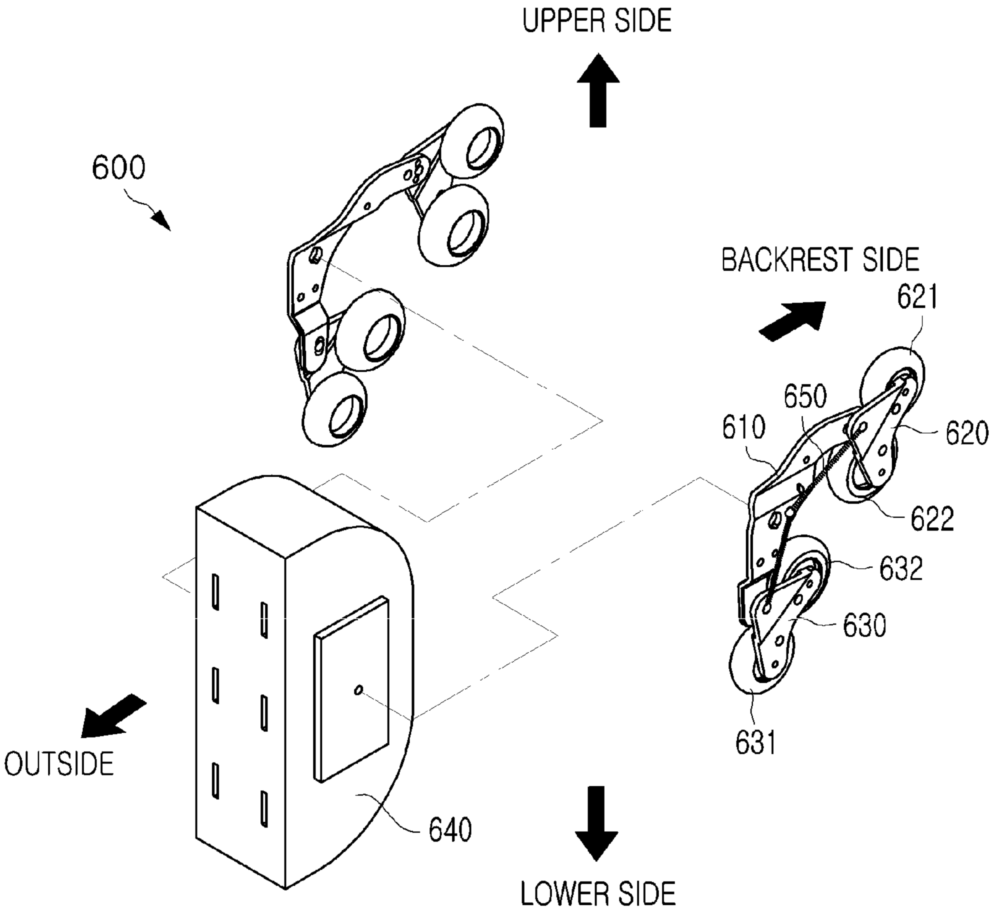
FIG. 3 is an overall perspective view for describing a massage ball assembly according to an embodiment of the present disclosure.

Referring to FIG. 3, the massage ball assembly 600 according to the embodiment of the present disclosure comprises a main frame 610, tilting frames 620 and 630, massage balls 621 and 631, heating balls 622 and 632, a massage bundle 640, and an elastic member 650.

Two main frames 610 are provided in one massage ball assembly 600, and two main frames 610 may be mounted on both ends of the massage bundle 640 mounted on the backrest portion 100, and the main frame 610 may be moved according to up, down, left, and right movements of the massage bundle 640.

For fixing to the massage bundle 640, a fixing groove 611 is formed in the center of the main frame 610. As a fixing method, a screw fastening method may be applied, but the present disclosure is not limited thereto, and any method enabling the fixing to the massage bundle 640 may be applied.

The main frame 610 comprises a first main frame 612 that extends from the fixing groove 611 toward the backrest portion 100, and a second main frame 613 that extends downward.

The tilting frames 620 and 630 are rotatably mounted on both ends of the main frame 610, and the massage balls 621 and 631 and the heating balls 622 and 632 are mounted on the tilting frames 620 and 630.

The main frame 610 is fixed to the massage bundle 640, but the tilting frames 620 and 630 are mounted to be rotatable with respect to the main frame 610 and provide an optimal massage feeling by reflecting the curves of the user's shoulders, back, waist, and buttocks.

Figure 4:
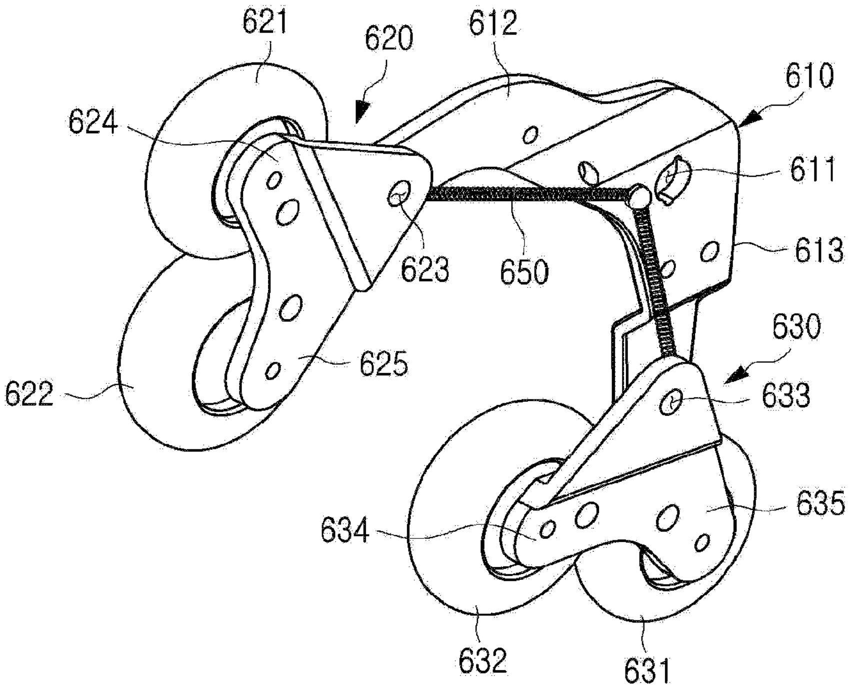
FIG. 4 is an enlarged view of part of the massage ball assembly of FIG. 3.

In detail, the tilting frames 620 and 630 are implemented with an embodiment as shown in FIG. 4 in which a total of two tilting frames 620 and 630 are mounted, one at the end of the first main frame 612 and the other one at the end of the second main frame 613. However, an embodiment in which only one tilting frame is mounted at the end of the first main frame 612, and an embodiment in which only one tilting frame is mounted at the end of the second main frame 613 are possible.

Hereinafter, as shown in FIG. 4, an embodiment in which two tilting frames 620 and 630 are provided and one thereof is mounted at the end of the first main frame 612 and the other one thereof is mounted at the end of the second main frame 613 will be described in more detail.

A first mounting grooves 623 and 633 for mounting on the main frame 610 are formed in the centers of the tilting frames 620 and 630, respectively. In the main frame 610 corresponding to the first mounting grooves 623 and 633, second mounting grooves 614 and 615 having a size larger than that of the first mounting grooves 623 and 633 are formed, respectively.

Specifically, the second mounting grooves 614 and 615 are formed to extend in the longitudinal direction of the main frame 610, and the shape thereof is formed to partially overlap the shapes of the plurality of first mounting grooves 623 and 633, respectively. The mounting positions of the tilting frames 620 and 630 with respect to the main frame 610 may be adjusted through the second mounting grooves 614 and 615. Since the curves of the shoulders, the back, the waist and the buttocks may be different for each user, the mounting positions of the tilting frames 620 and 630 with respect to the main frame 610 are changed to correspond to the curves so that optimal massage may be performed.

The tilting frames 620 and 630 comprise first tilting frames 624 and 634 that extend from the first mounting grooves 623 and 633 toward the backrest portion 100, and second tilting frames 625 and 635 that extend downward.

The heating balls 622 and 632 and the massage balls 621 and 631 are rotatably mounted on ends of the first tilting frames 624 and 634 and the second tilting frames 625 and 635.

Rotation of the heating balls 622 and 632 and the massage balls 621 and 631 and rotation of the tilting frames 620 and 630 are different from each other. However, the tilting frames 620 and 630 rotate with respect to the main frame 610 at a certain angle by using the first mounting grooves 623 and 633 as a rotation axis, whereas only the heating balls 622 and 632 and the massage balls 621 and 631 themselves rotate while being fixed at the mounting positions to the tilting frames 620 and 630.

That is, as the tilting frames 620 and 630 rotate with respect to the main frame 610 by using the first mounting grooves 623 and 633 as the rotation axis, compared with the case where heating balls and massage balls are mounted only on a main frame according to the related art and move up and down and left and right, optimal massage for the user's curves may be provided.

The heating balls 622 and 632 are provided with a heating wire to provide a feeling of heating to the user, and the massage balls 621 and 632 provide a massage feeling to the user.

In particular, the heating balls 622 and 632 may be mounted on the tilting frames 620 and 630 to be closer to the fixing groove 611 than the massage balls 621 and 631.

Figure 5:
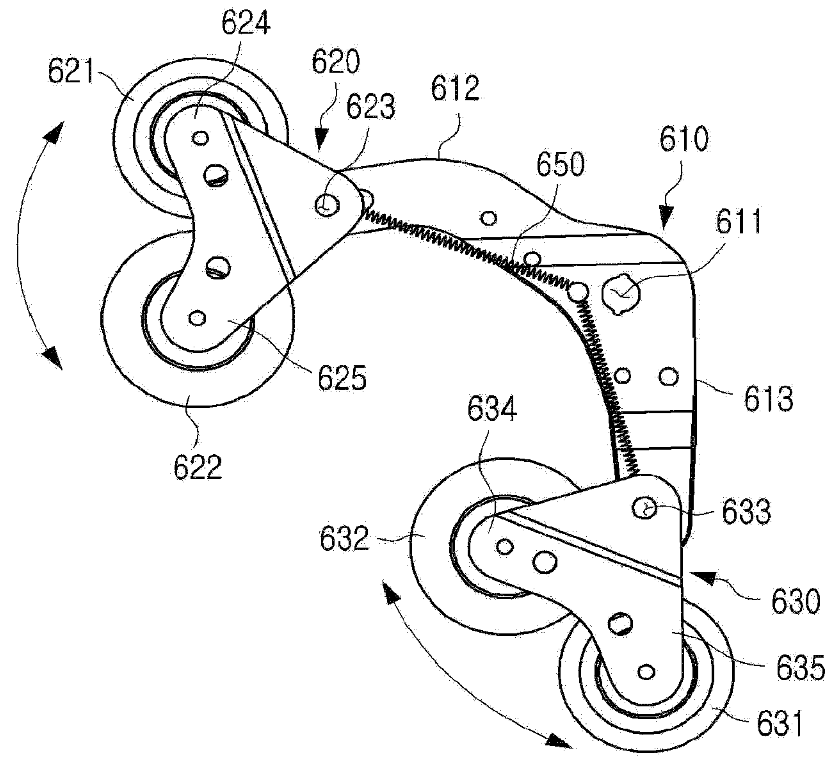
FIGS. 5 and 6 are side views of FIG. 4.
Figure 6:
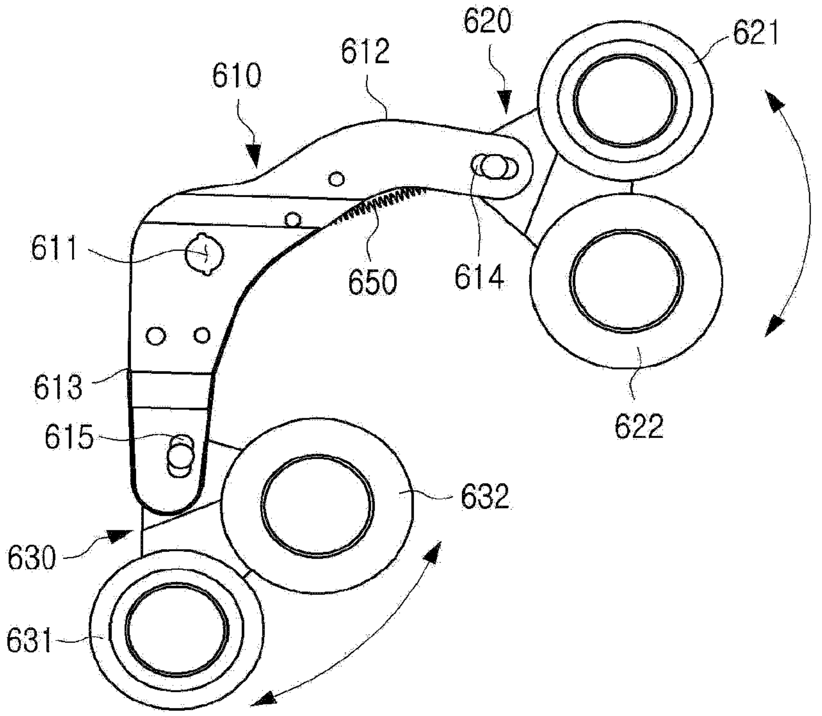
Figure 7:
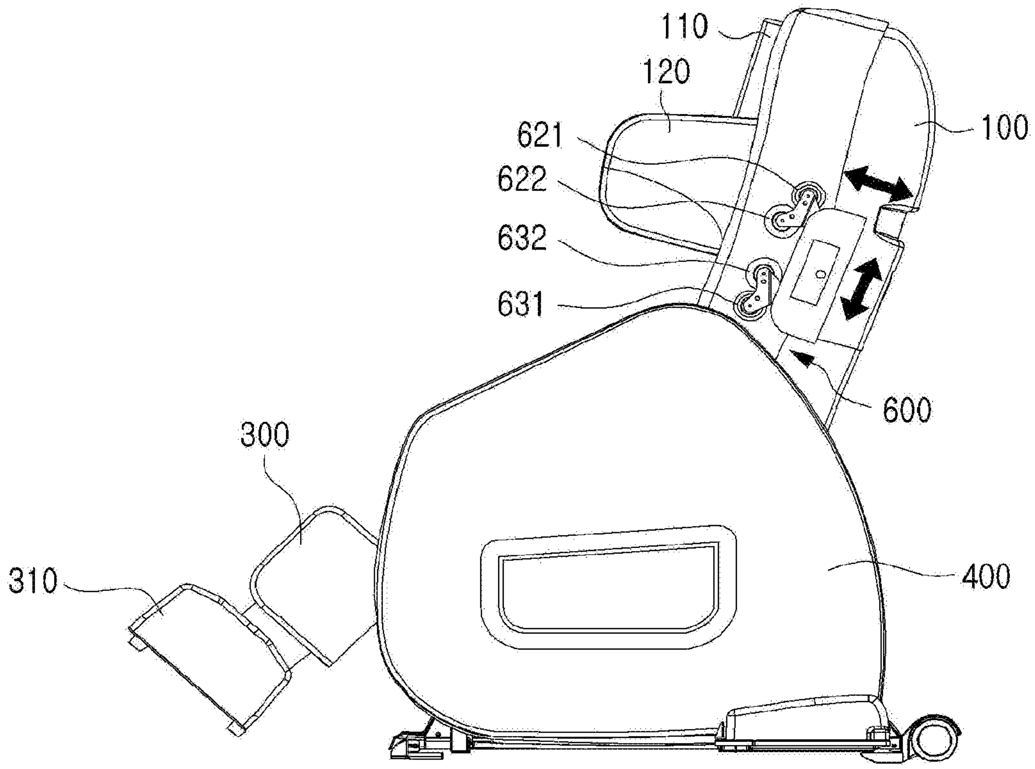
FIG. 7 is a side view of a massage chair in which the massage ball assembly according to an embodiment of the present disclosure is applied.

That is, as shown in FIG. 5, the heating ball 622 of the upper tilting frame 620 is mounted on one end of the second tilting frame 625, and the heating ball 632 of the lower tilting frame 630 is mounted on one end of the first tilting frame 634.

As the heating balls 622 and 632 are mounted at the positions described above, the massage balls 621 and 631 are mounted on one end of the tilting frame 620 on which the heating balls 622 and 632 are not mounted.

That is, as shown in FIG. 5, the massage balls 621 of the upper tilting frame 620 is mounted on one end of the first tilting frame 624, and the massage ball 631 of the lower tilting frame 630 is mounted on one end of the second tilting frame 635.

The heating balls 622 and 632 are closer to the fixing groove 611 of the main frame 610 so that the massage balls 621 and 631 may be positioned outside the tilting frames 620 and 630. Thus, the massage balls 621 and 631 may be positioned along a path on which providing of a massage feeling provided by the massage balls 621 and 631 is longer than when the massage balls 621 and 631 are being positioned inside the tilting frames 620 and 630.

In addition, since the heating balls 622 and 632 according to the embodiment of the present disclosure are mounted on different parts of the massage balls 621 and 631 and the tilting frames 620 and 630, a feeling of heating due to the heating balls 622 and 632 may be provided independently of providing of a massage feeling provided by the massage balls 621 and 631.

In a conventional massage chair, since heating balls are positioned opposite to massage balls with a main frame interposed therebetween and compression using the massage balls is performed when the feeling of heating is provided by the heating balls, the user cannot experience the feeling of heating properly. In this way, in the massage ball assembly 600 according to the embodiment of the present disclosure, the movement of the heating balls and the massage balls, which are inevitably dependent on each other in a conventional massage chair, is independently taken so that a more reliable feeling of heating may be provided to the user.

The above-described tilting frames 620 and 630 may be connected to the main frame 610 by the elastic member 650.

The elastic member 650 provides a restoring force to the tilting frames 620 and 630 that rotate with respect to the main frame 610 by its own elastic force. Accordingly, the tilting frames 620 and 630 may be rotated according to the user's curves and returned to their original positions by the elastic member 650.

The above-described present disclosure has the following effects.

First, since tilting frames are mounted to be rotatable with respect to a main frame at a certain angle, optimal massage reflecting the user's shoulders, back, waist, and buttocks can be provided through massage balls mounted on one end of the tilting frame.

Second, a disadvantage that, since heating balls are independent of the movement of the massage balls, the pressure is required to be applied to the user at the same time so as to provide a feeling of heating, is solved at once.

Third, as the mounting positions of the tilting frames are adjusted, the tilting frames are mounted on the main frame to correspond to the user's curves so that optimal massage can be performed.

While the present disclosure has been particularly shown and described with reference to exemplary embodiments thereof, it will be understood by those of ordinary skill in the art that various changes in form and details may be made therein without departing from the spirit and scope of the present disclosure as defined by the following claims.

What is claimed is:

1. A massage ball assembly for a massage chair, the massage ball assembly comprising:

a massage bundle mounted on a backrest portion of the massage chair;

a main frame mounted on the massage bundle and including a first main frame extending toward a first side from a position mounted on the massage bundle and a second main frame extending towards a second side;

a first tilting frame mounted at an end of the first main frame and rotatably mounted with respect to the first main frame with a mounted position of the first tilting frame as an axis of rotation;

a second tilting frame mounted at an end of the second main frame and rotatably mounted with respect to the second main frame with a mounted position of the second tilting frame as an axis of rotation;

a first massage ball mounted on one end of the first tilting frame and rotatably mounted with respect to the first tilting frame;

a second massage ball mounted on one end of the second tilting frame and rotatably mounted with respect to the second tilting frame;

a first elastic member having a first end connected to the first tilting frame and a second end connected to the main frame; and a second elastic member having a first end connected to the second tilting frame and a second end connected to the main frame.

2. The massage ball assembly of claim 1, wherein the first tilting frame and the second tilting frame are configured to rotate independently of each other with respect to the main frame due to flexion of a user body.

3. The massage ball assembly of claim 1, wherein the first massage ball and the second massage ball are configured to rotate with respect to the first tilting frame and the second tilting frame due to flexion of a user body.

4. The massage ball assembly of claim 1, wherein the massage ball assembly further comprises:

a first heating ball mounted on the other end of the first tilting frame and rotatably mounted with respect to the first tilting frame; and a second heating ball mounted on the other end of the second tilting frame and rotatably mounted with respect to the second tilting frame.

5. The massage ball assembly of claim 4, wherein the first heating ball and the second heating ball are configured to rotate with respect to the first tilting frame and the second tilting frame due to flexion of a user body.

6. The massage ball assembly of claim 4, wherein the first massage ball and the second massage ball are disposed outside the main frame, and the first heating ball and the second heating ball are disposed inside the main frame.

7. The massage ball assembly of claim 1, wherein the first tilting frame and the second tilting frame are configured to rotate in the same direction or in different direction due to flexion of a user body, such that the spacing between the first tilting frame and the second tilting frame is changed.

8. The massage ball assembly of claim 1, wherein the first tilting frame and the second tilting frame include a first mounting groove for mounting the first main frame and the second main frame at the center, respectively, and the first main frame and the second main frame include a second mounting groove at a position corresponding to the first mounting groove.

9. The massage ball assembly of claim 8, wherein the second mounting groove is larger than the first mounting groove and extends in the longitudinal direction of the first main frame and the second main frame.

* * * * *